United States Patent Office 2,974,528
Patented Mar. 14, 1961

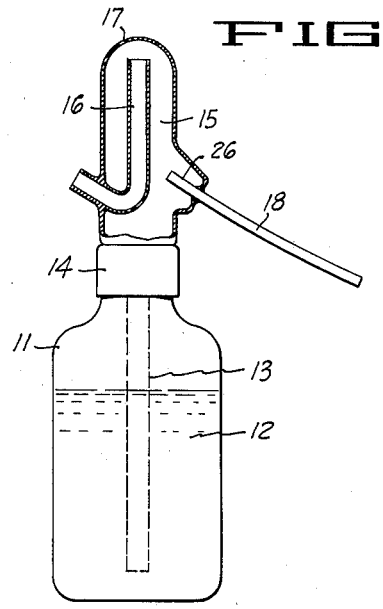
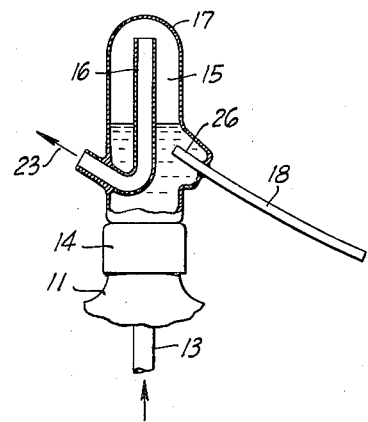
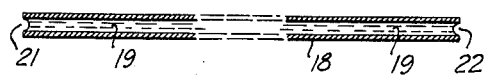
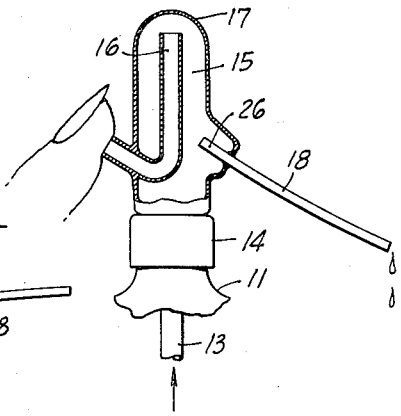
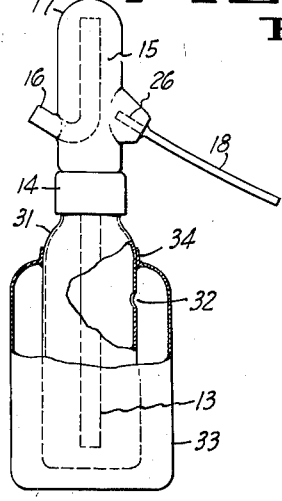
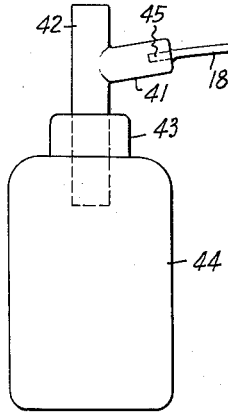
INVENTOR.
Manuel C. Sanz
ATTORNEYS

2,974,528
PIPETTE

Manuel C. Sanz, Rte. de Ferney, Versoix, Switzerland

Filed Apr. 11, 1957, Ser. No. 652,265

9 Claims. (Cl. 73—425.4)

This invention relates generally to pipettes and more particularly to pipettes for the transfer of predetermined reproducible quantities of liquid.

In laboratory work, particularly in analytical chemistry, pipettes are used to transfer predetermined quantities of liquid. In many applications it is important that the predetermined quantity transferred be accurate and that it will not vary from one operation to the next. In short, it is desirable that the pipette be capable of reproducing the predetermined volume transferred. This is generally difficult to accomplish with pipettes currently available.

It is, therefore, a general object of the present invention to provide an improved pipette.

It is still another object of the present invention to provide an improved pipette suitable for the transfer of precise amounts of liquid and which is capable of accurately reproducing the volume transferred.

It is another object of the present invention to provide a pipette in which precise amounts of liquid are retained in a capillary passage of predetermined length.

It is another object of the present invention to provide a pipette which includes a capillary tube having a passage capable of retaining a predetermined volume of liquid by capillary action. The tube extends into a chamber which has its lower portion in communication with a reservoir of liquid. Means are provided for causing the liquid in the reservoir to rise up into the chamber and submerge the adjacent end of the tube whereby the capillary passage is filled with liquid.

It is still another object of the present invention to provide a pipette which is easy and simple to operate and which delivers reproducible amounts of liquid.

These and other objects of the invention will become more clearly apparent from the following description taken in conjunction with the accompanying drawing.

Referring to the drawing:

Figure 1 is an elevational view partly in section of one embodiment of the invention;

Figure 2 is a partial view showing the capillary being filled;

Figure 3 is a partial view showing the capillary being emptied;

Figure 4 is an enlarged sectional view of the capillary tube;

Figure 5 is an elevational view partly in section showing another embodiment of the invention; and Figure 6 is an elevational view partly in section showing still another embodiment of the invention.

The pipette illustrated in Figure 1 comprises a flask or reservoir 11 which serves to form a reservoir for the liquid 12 to be measured and transferred. A tube 13 extends downwardly through the mouth of the flask having its lower end submerged in the liquid 12. The tube extends through a cork or other suitable cover 14 and communicates at its upper end with the space 15. The flask 11 may be made of material which is elastically deformable, for example, polyethylene. In this event the flask may be squeezed to cause the liquid 12 to rise in the tube 13 and partially fill the chamber 15, for purposes to be presently described. It is apparent that other means may be employed for causing the liquid to rise in the tube 13. For example, pressure could be applied by blowing into the flask through a suitable aperture in which event the flask need not be deformable.

A tube 16 extends inwardly and upwardly into the member 17 which forms the space 15. One end of the tube communicates with the outside air and the other end communicates with the space 15. A capillary tube 18 has one end communicating with the space 15 and its other end with the outside. The capillary is suitably sealed to the member 17.

Figure 4 shows an enlarged view of the capillary tube 18 which by capillary action retains a predetermined volume of liquid 19 betwen the meniscuses 21 and 22. The shape of the meniscuses may vary from one liquid to another, however, each is always identical for a particular liquid. Thus, predetermined reproducible amounts of liquid may be measured, said amounts being contained in the capillary between the two meniscuses. Preferably, the tube 18 is made of non-wettable material whereby when the predetermined volume of liquid is expelled, as will be presently described, no film remains. The tube 18 is also, preferably, made of flexible material whereby it is not broken or injured upon striking any object. A suitable material, for example, is polyethylene.

When using polyethylene or like material, the capillary tube may be easily calibrated by cutting it off until the predetermined volume is contained between the meniscuses. This can easily be determined by weighing an empty tube and then filling the tube with liquid and cutting until the combination has a predetermined weight.

Operation of the apparatus described is as follows: Pressure is applied to the liquid in the flask, for example, by compressing the flask 11. The liquid 12 rises in the tube 13 and occupies a portion of the space 15, Fig. 2. Air is expelled from the space 15 through the tube 16 by the rising liquid, as indicated by the arrow 23. When the liquid has risen to a level which submerges the end 26 of the capillary tube, the opening 16 is closed. As the liquid continues to rise in the space 15, a pressure is built up which causes the liquid to flow outwardly in the capillary 18. As soon as a drop of the liquid falls from the exposed end of the capillary, the opening 16 is opened. The flask is released to allow the liquid in the space 15 to flow back into the flask. A predetermined amount of liquid then remains in the capillary betwen the meniscuses, as previously described.

To expel the liquid from the capillary, the opening 16 is closed and the flask again compressed. As the liquid 12 rises in the tube 13 and space 15, pressure is built up in the chamber 15 which urges the liquid out of the capillary.

If the tube is non-wettable as previously described, then all of the liquid will be expelled leaving no film in the capillary passage. If the tube is wettable, then when the liquid is expelled, a film will remain in the capillary passage. However, for a given liquid the film will reproduce and therefore predetermined reproducible amounts of liquid will, nevertheless, be measured.

Preferably, the liquid is expelled at a slow rate. In general, for accurate reproducibility, the rate should be constant from sample to sample. In this manner any droplets or film which might remain in the capillary will have a constant volume from one operation to the next.

Thus, it is seen that it is possible to transfer with precision small quantities of liquid. For example, apparatus has been constructed in which predetermined quantities of liquid in the order of 1–250 mm.$^3$ have been accurately delivered. It has also been found that the reproducibility possible with the apparatus of the type described is very good with variations in the order of .1 to .2%. It is to be noted that the forces to fill and to empty the capillary are both applied at the same end thereof. Thus the liquid is always protected from the surroundings.

In many instances it may be desirable to have a flask which is made of glass. Referring to Figure 5, a flask 31 made of glass has an aperture 32 formed therein through which pressure may be applied to the inside of the flask. For example, a deformable member 33 may surround the flask and fit tightly about the upper portion 34. To fill the flask, the member 33 is drawn downwardly on the flask 31 to expose the aperture 32 and the liquid is placed in the flask through the aperture. The member 33 is then moved upwardly. By squeezing the member 33, a pressure is created in the flask 31 which causes the liquid to rise in the tube 13, as previously described.

Figure 6 shows another embodiment of the invention. The capillary 18 is inserted in the tube 41 which communicates with the tube 42. The upper end of the tube 42 may be closed by a finger. Alternately, a valve may be connected thereto for opening and closing the tube. The lower portion of the tube 42 extends through a closure 43 and communicates with the inside of a deformable flask 44.

To fill the capillary tube, the exposed end is immersed in liquid. The vessel 44 is compressed, then the tube 42 is closed. The flask is released and the liquid is drawn into the capillary until a droplet forms on the end 45. The tube 42 is then opened. The capillary is removed from the liquid. A predetermined amount of liquid is contained between the meniscuses formed on the end of the capillary. To expel the liquid the tube 42 is closed and the vessel 44 compressed to create a pressure which serves to urge the liquid outward. Excess liquid flows down into the bottle which also acts as a waste bottle. Succeeding samples clean the capillary, the liquid forming the droplet at the end 45 having served to clean the capillary passage.

Thus, it is seen that an improved pipette is provided. The pipette is capable of precisely measuring and reproducing predetermined amounts of liquid samples. The pipette is simple in construction and easy to operate. A skilled operator is not required to operate the pipette. Many samples may be measured in a short interval of time.

I claim:

1. A pipette for the delivery of measured volumes of liquid comprising means forming a chamber, the upper end of said chamber being normally open to the surrounding air but adapted to be selectively closed therefrom, a capillary tube of predetermined length and cross-sectional area whereby in its full state it will retain a predetermined volume of liquid between meniscuses formed at its two extremities, said capillary tube having one end communicating with said chamber above the bottom thereof, a reservoir serving to retain said liquid, communication means for delivering said liquid between said reservoir and said chamber in both directions, and means for selectively applying pressure at said reservoir whereby upon a first application of pressure said chamber may be filled above said one end of the capillary tube with liquid and with the upper end of said chamber closed, said capillary tube may be filled with the liquid in the chamber upon a subsequent release of said pressure and opening the upper end of said chamber to the surrounding air, a portion of the liquid may return to the reservoir to lower the level in said chamber below said end of the tube and upon a second application of pressure with the upper end of said chamber closed, the fluid in said capillary tube may be expelled.

2. A pipette for the delivery of measured volumes of liquid comprising means forming a chamber, the upper portion of said chamber being normally open to the surrounding air but adapted to be selectively closed therefrom, a capillary tube of predetermined length and cross-sectional area for retaining a predetermined volume of liquid between meniscuses formed at its two extremities, said capillary tube having one end in communication with said chamber above the bottom thereof, a reservoir serving to retain said liquid, means for establishing communication between said reservoir and said chamber whereby liquid may flow in both directions and means for selectively applying pressure upon the liquid in said reservoir whereby upon a first application of pressure liquid moves from the reservoir into said chamber to a level above said one end of said capillary tube, and, with the upper portion of said chamber closed, said capillary tube may be filled with liquid from the chamber, whereafter upon opening of the upper portion of the chamber to the surrounding air and releasing said pressure, the liquid not retained in said capillary tube returns from the chamber to the reservoir and upon a second application of pressure with the upper portion of said chamber closed, the fluid in said capillary tube may be expelled.

3. Apparatus as in claim 2 wherein said reservoir comprises a deformable container whereby the liquid is forced upwardly into the chamber by deforming the reservoir.

4. Apparatus as in claim 2 wherein said capillary tube is flexible and non-wettable.

5. Apparatus as in claim 2 wherein said capillary tube is formed of polyethylene.

6. A pipette for the delivery of measured volumes of liquid comprising a capillary tube of predetermined length and cross-sectional area whereby at its full state it will retain liquid, a reservoir for retaining the liquid, means forming a chamber, communication means for delivering the liquid between the chamber and the reservoir in both directions, said capillary tube having one end communicating with the interior of the chamber, means above the level of said one end of the capillary tube for opening the chamber to the surrounding air, means for selectively applying pressure to said reservoir whereby upon a first application of pressure the liquid rises into the chamber and submerges the end of the capillary tube, and upon a release of said pressure said liquid subsides below said tube and upon a second application of said pressure said liquid is expelled from the capillary.

7. A pipette for the delivery of measured volumes of liquid comprising a capillary tube of predetermined length and cross-sectional area whereby at its full state it will retain a predetermined volume of liquid, a deformable reservoir serving to retain liquid, means forming a chamber, communication means for delivering the liquid between the chamber and reservoir in both directions, said capillary tube having one end extending into the chamber, means above the level of said one end of the capillary tube providing communication between the chamber and the surrounding air, said reservoir being deformed to cause the liquid to rise into said chamber and submerge the one end of the capillary tube and said reservoir being deformed to create pressure in the chamber to expel the liquid retained by the capillary.

8. The pipette as claimed in claim 7 wherein said capillary tube is non-wettable.

9. The pipette as claimed in claim 8 wherein said capillary tube is formed of polyethylene.

References Cited in the file of this patent

UNITED STATES PATENTS

| 2,376,231 | Cohn | May 15, 1945 |
| 2,667,074 | Whitehill et al. | Jan. 26, 1956 |
| 2,730,270 | Heinemann | Jan. 10, 1956 |

OTHER REFERENCES

P. L. Kirk, Quantitative Ultramicroanalysis, John Wiley & Sons, Inc., 1950 (p. 26 pertinent).

C. A. Notebook, September 1955 (a publication of the Chicago Apparatus Co., 1735 N. Ashland Ave., Chicago 22, Illinois), pp. 6 and 7 pertinent.